(12) United States Patent
Alford

(10) Patent No.: US 6,644,049 B2
(45) Date of Patent: Nov. 11, 2003

(54) SPACE CONDITIONING SYSTEM HAVING MULTI-STAGE COOLING AND DEHUMIDIFICATION CAPABILITY

(75) Inventor: Malcolm L. Alford, Coppell, TX (US)

(73) Assignee: Lennox Manufacturing Inc., Richardson, TX (US)

( * ) Notice: Subject to any disclaimer, the term of this patent is extended or adjusted under 35 U.S.C. 154(b) by 0 days.

(21) Appl. No.: 10/123,682

(22) Filed: Apr. 16, 2002

(65) Prior Publication Data

US 2003/0192331 A1 Oct. 16, 2003

(51) Int. Cl.$^7$ .............................. F25B 49/00; F25B 29/00
(52) U.S. Cl. .............................................. 62/173; 62/90
(58) Field of Search ............................ 62/173, 175, 90, 62/176.5

(56) References Cited

U.S. PATENT DOCUMENTS

| | | | |
|---|---|---|---|
| 4,069,030 A | 1/1978 | Nickell et al. | 62/176.5 |
| 5,129,234 A | 7/1992 | Alford | 62/176.6 |
| 5,622,057 A | 4/1997 | Bussjager et al. | 62/173 |
| 5,752,389 A | 5/1998 | Harper | |
| 5,887,651 A * | 3/1999 | Meyer | 165/223 |
| 5,953,926 A * | 9/1999 | Dressler et al. | 62/173 X |

FOREIGN PATENT DOCUMENTS

EP 0161846 A2 11/1985 ............ F24F/11/00

OTHER PUBLICATIONS

Brochure on Carrier's Moisturemiser Product.

* cited by examiner

*Primary Examiner*—William Wayner
(74) *Attorney, Agent, or Firm*—W. Kirk McCord

(57) ABSTRACT

In accordance with the present invention, a space conditioning system having multi-stage cooling and dehumidification capability is provided. The system includes plural refrigeration circuits operable in a cooling mode to provide cooled air to an indoor space. At least one of the refrigeration circuits is also operable in a reheat mode, wherein air is dehumidified by cooling it and then reheating it before it is supplied to the space. A control system is provided for controlling the operation of the refrigeration circuits to satisfy both a demand for cooling and a demand for dehumidification. Depending upon the level of demand for cooling, the system is operated to satisfy the dehumidification demand and the cooling demand simultaneously. However, in response to a higher level of demand for cooling (e.g., a second stage demand, or in some cases, a higher demand), the demand for cooling takes priority over the dehumidification demand. When the system is equipped with an economizer option, the economizer is operated to provide free cooling when the ambient outdoor air conditions are suitable. However, when a demand for dehumidification is present, the economizer option is not used, even if the ambient outdoor air conditions are suitable and there is a demand for cooling in the space.

17 Claims, 8 Drawing Sheets

SPACE CONDITIONING SYSTEM HAVING MULTI-STAGE COOLING AND DEHUMIDIFICATION CAPABILITY

FIELD OF INVENTION

This invention relates generally to space conditioning systems for conditioning the temperature and humidity of air supplied to an enclosed space and in particular to a space conditioning system having multiple stages of cooling and dehumidification capability.

BACKGROUND ART

Space conditioning systems, including systems which use a vapor compression refrigerant to cool air recirculated to a conditioned space, often require relatively accurate control of the humidity in the air within the conditioned space. In one such system, as described in U.S. Pat. No. 5,622,057, a heat exchanger is positioned downstream of the system evaporator to subcool the condensed liquid refrigerant before it enters the evaporator, to enhance dehumidification of the air passing through the evaporator and to reheat the air after it passes through the evaporator. A major disadvantage of this type of system is that dehumidification of the air supplied to an indoor space occurs only when there is a cooling demand. Another disadvantage of prior art space conditioning systems using vapor compression is that more energy input is required to provide the required cooling, dehumidification and reheat of the circulated air because the air must be cooled below the temperature required to meet the cooling demand in the space in order to dehumidify the air and then the air must be reheated to a desired temperature.

An improved space conditioning system which provides dehumidification of air supplied to an enclosed space is described in co-pending U.S. Pat. No. 6,427,461. In this system, dehumidification is provided by cooling and reheating air supplied to the space in the absence of a demand for cooling when there is a demand for dehumidification. However, if a cooling demand occurs at the same time as a demand for dehumidification, priority is given to meeting the cooling demand, regardless of the dehumidification requirements.

Accordingly, there is a need for an improved space conditioning system having the capability to simultaneously meet both a cooling demand and a dehumidification demand.

SUMMARY OF INVENTION

In accordance with the present invention, a space conditioning system for conditioning air within an enclosed space is comprised of an air mover for circulating air to the enclosed space; plural discrete refrigeration circuits, each of which is operable in a cooling mode wherein air circulated to the space is cooled and at least one of which is further operable in a reheat mode wherein air circulated to the space is first cooled and then reheated; and a controller for selectively controlling the system to provide the space with conditioned air.

In accordance with an aspect of the invention, the controller is operable to cause at least one of the refrigeration circuits to operate in the cooling mode in response to a demand for cooling in the space and at least another one of the refrigeration circuits to operate in the reheat mode in response to a demand for cooling and a demand for dehumidification in the space both being present.

In accordance with another aspect of the invention, the controller is operable to prevent any of the refrigeration circuits from operating in the reheat mode in response to a predetermined level of cooling demand in the space (e.g., a second stage or higher demand), even if a demand for dehumidification is also present. Therefore, in response to a higher level of cooling demand, priority is given to satisfying the cooling demand over the dehumidification demand.

Still further, the invention provides a space conditioning system having a damper for admitting ambient outdoor air to the system for circulation to the enclosed space and an enthalpy sensor for sensing the enthalpy of the outdoor air. The controller is further operable to control the damper to allow the outdoor air to be admitted to the system in response to a demand for cooling in the space when the enthalpy of the outdoor ambient air satisfies a predetermined condition. In accordance with yet another aspect of the invention, the controller is operable to inhibit the outdoor ambient air from being admitted to the system when a demand for dehumidification is present, even when a demand for cooling is also present and the enthalpy of the outdoor ambient air satisfies the predetermined condition.

In accordance with a preferred embodiment of the invention, the system includes four discrete refrigeration circuits, all of which are operable in the cooling mode and at least two of which are also operable in the reheat mode. Each circuit includes a condenser for condensing the vapor refrigerant, an evaporator for evaporating the liquid refrigerant and a compressor for compressing the vapor refrigerant and for circulating the refrigerant through the circuit. Each of the refrigeration circuits operable in the reheat mode further includes a reheat heat exchanger downstream of the evaporator for heating air cooled by the evaporator to a temperature above the temperature of air discharged from the evaporator when the circuit is operated in the reheat mode. The air is cooled and dehumidified by the evaporator and then reheated by the reheat heat exchanger so that dehumidified (but not substantially cooled) air is provided to the space in response to a demand for dehumidification of the air therein.

In accordance with the present invention, a space conditioning system is provided having the capability of simultaneously satisfying both a demand for cooling and a demand for dehumidification in an enclosed space, with priority given to satisfying the cooling demand. This is accomplished by operating at least one of the refrigeration circuits in the cooling mode and at least one of the refrigeration circuits in the reheat mode, as described hereinabove. Nevertheless, in response to a higher level of cooling demand, the cooling demand takes priority and all of the refrigeration circuits are inhibited from operating in the reheat mode until the higher level cooling demand is satisfied.

BEST MODE FOR CARRYING OUT THE INVENTION

Figure 1:
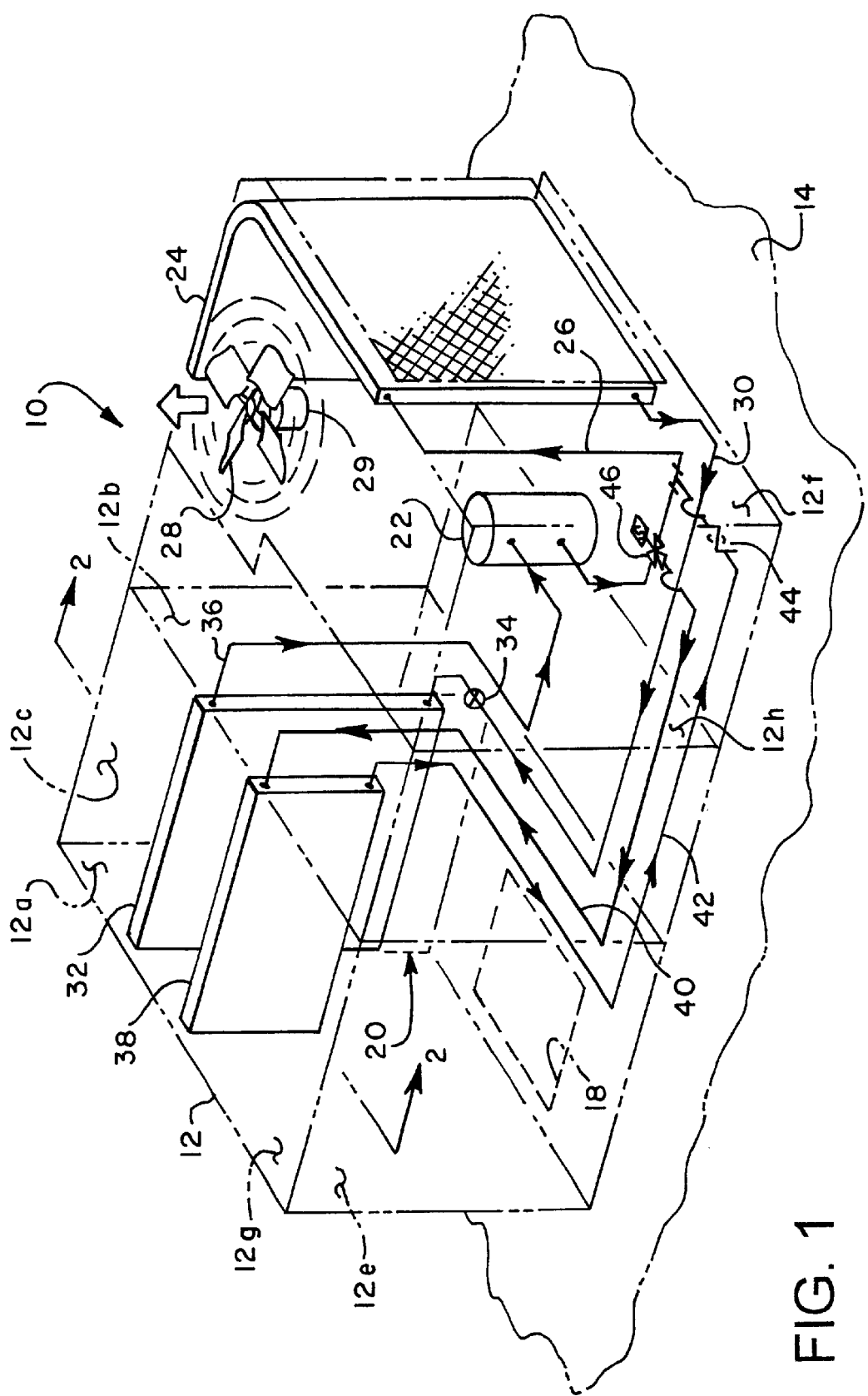
FIG. 1 is a perspective view, in somewhat schematic form, of an air conditioning system having a single compressor and single refrigeration circuit, in accordance with the present invention.

In the description which follows, like parts are marked throughout the specification and drawings with the same reference numerals, respectively. The drawing figures are not necessarily to scale and in some instances certain features of the invention are shown in schematic or generalized form in the interest of clarity and conciseness. The term "air conditioning" is used to refer to a system which conditions air to meet an air temperature and humidity requirements of an enclosed space and may include heating as well as cooling air supplied to the enclosed space.

Figure 2:
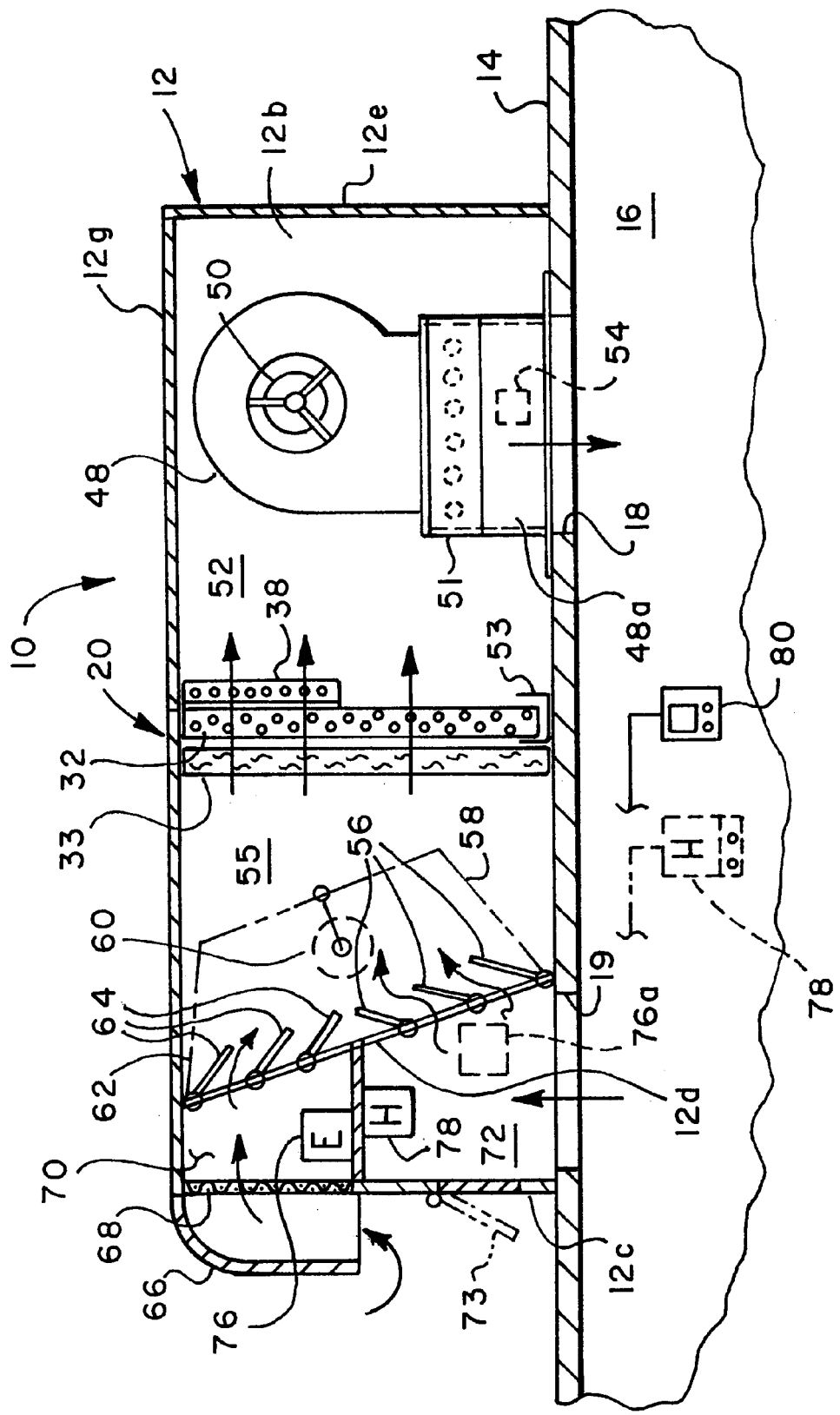
FIG. 2 is a section view, also in somewhat schematic form, taken along the 2—2 of FIG. 1.

Referring to FIGS. 1 and 2, there is illustrated an air or space conditioning system in accordance with the present invention and generally designated by numeral 10. The space conditioning system 10 is shown, by way of example, as a so-called "rooftop" system having a generally rectangular box-like enclosure or cabinet 12 adapted to be mounted on a generally horizontal surface or rooftop 14. As shown in FIG. 2, space conditioning system 10 is adapted to deliver conditioned air to an enclosed space 16 by way of an opening 18 and air within the enclosed space 16 is returned to system 10 by way of an opening 19 to cabinet 12 for conditioning by system 10.

As shown in FIG. 1, system 10 preferably includes a vapor compression refrigeration unit 20, including a compressor 22 for compressing a conventional refrigeration fluid for delivery to a conventional finned coil type heat exchanger comprising a condenser 24, by way of a conduit 26. A condenser fan 28 is suitably mounted on cabinet 12 for drawing air through condenser 24 in a conventional manner. Condenser fan 28 is preferably driven by a suitable electric motor 29. Condensed refrigerant fluid is conducted from condenser 24 by way of a conduit 30 to another conventional finned coil type heat exchanger comprising an evaporator 32, which is disposed within cabinet 12 and arranged in an air flowpath through cabinet 12, generally as shown in FIG. 2. Evaporator 32 is typically disposed downstream of a suitable impingement type filter 33 (FIG. 2) which is also disposed in the air flowpath between return opening 19 and supply opening 18 for space 16. Evaporator 32 extends substantially between an outer side wall 12a and an intermediate wall 12b of cabinet 12.

Referring again to FIG. 1, the refrigerant circuit connected to evaporator 32 includes an expansion device 34 interposed in conduit 30 leading into evaporator 32. Refrigerant fluid evaporated in evaporator 32 is returned to compressor 22 by way of a conduit 36. Space conditioning system 10 advantageously utilizes refrigerant gas that has been heated by the work of compression to provide heat exchange to the air being conditioned by way of a serpentine finned coil type heat exchanger comprising a reheat heat exchanger 38, through which heated refrigerant gas may be circulated by way of an inlet conduit 40. Reheat heat exchanger 38 also extends substantially between walls 12a and 12b and, by way of example, extends over about 50% of the area of evaporator 32. Compressed refrigerant gas is discharged from reheat heat exchanger 38 by way of a conduit 42, which is connected to conduit 26 leading to condenser 24 by way of a suitable one-way or check valve 44, to prevent fluid from flowing in a direction opposite of the direction indicated by the arrows of conduit 42. Heated refrigerant gas or vapor discharged from compressor 22 may be routed directly to condenser 24 by way of conduit 26 or routed by way of conduit 40 to reheat heat exchanger 38. Control of the routing of heated refrigerant gas to reheat exchanger 38 or to condenser 24 is accomplished by actuation of a motor-operated reheat valve 46 (FIG. 1) and interposed in conduit 26 and connected to conduit 40. Reheat valve 46 may be a conventional solenoid-actuated valve, by way of example.

Referring further to FIG. 2, system 10 includes a motor-driven blower 48 of conventional construction and a suitable electric drive motor 50. In a preferred embodiment, as shown, blower 48 is disposed within cabinet 12 in a space 52 downstream of evaporator 32 and reheat heat exchanger 38 for returning conditioned air to space 16 through opening 18. However, blower 48 may be disposed upstream of evaporator 32 and reheat exchanger 38 in an alternate embodiment. Blower 48 is shown mounted on a heater unit 51, whereby air returned to enclosed space 16 by way of opening 18 may be conditioned by heater unit 51, if desired. Heater unit 51 may be one of several types of conventional heater units, wherein air discharged from blower 48 passes over suitable heat exchange surfaces when heater unit 51 is operable. Heater unit 51 is mounted on discharge or supply air duct part 48a, which is in communication with opening 18.

A suitable sensor 54 is preferably interposed in duct part 48a or may, depending on the configuration of system 10, be disposed in a suitable air supply duct further downstream from and connected to duct part 48a, but upstream of space 16. The location of sensor 54 and duct part 48a is exemplary. Sensor 54 may be characterized as a temperature sensor or as an enthalpy sensor generally of a type described further herein.

As shown in FIG. 2, reheat heat exchanger 38 is disposed downstream in the direction of air flow through system 10 from evaporator 32 and is preferably spaced about one inch or more from evaporator 32 to prevent condensed water vapor collecting on evaporator 32 from being carried over and residing on the fins or tube structure of reheat heat exchanger 38. Typically, condensed water vapor collecting on the fins and tubes of evaporator 32 will flow downward to a condensate collection pan 53, as shown in FIG. 2, for suitable discharge from system 10. Other spacings between evaporator 32 and reheat heat exchanger 38 may be suitable.

Upstream of evaporator 32 is an enclosed space 55 within cabinet 12, through which air from space 16 may flow by way of opening 19 and spaces formed between a set of moveable louvers or damper vanes 56, which are mechanically linked to each other and to linkage 58, for example, connected to a suitable actuator or positioning motor 60. Positioning actuator or motor 60 is also connected via linkage 62 to a damper comprising a second set of moveable louvers or vanes 64 for controlling the entry of ambient outdoor air into space 55 for flow through evaporator 32 and reheat heat exchanger 38 and discharge into space 16. The apparatus comprising the aforementioned sets of louvers 56 and 64 and actuator motor 60 connected thereto is also sometimes known in the art as an "economizer".

As shown in FIG. 2, outdoor ambient air may be admitted to space 55 by way of a rain shroud 66, a suitable filter screen 68 and an enclosed space 70, which is partitioned from a space 72 by a suitable transverse partition 74. Partition 74 extends between walls 12a and 12b and between a cabinet rear wall 12c and a frame 12d for louvers 56 and 64. Walls 12e and 12f and roof 12g, generally, form the remaining exterior walls defining enclosure or cabinet 12, as shown.

As shown in FIG. 2, a suitable enthalpy sensor 76 is disposed in space 70 for sensing the total enthalpy of ambient outdoor air admitted to space 70. A suitable humidity sensor 78 is preferably disposed in return air space 72 or may, alternatively, be disposed within space 16, as indicated in FIG. 2. Moreover, another enthalpy sensor 76a may be disposed in return air space 72, for example, for sensing the total enthalpy of air being returned from space 16 by way of opening 19. Accordingly, differential enthalpy measurements may be made by sensors 76 and 76a to determine the total enthalpy of outdoor air being admitted to system 10 as well as the total enthalpy of the return air to system 10 from space 16. If the enthalpy of the outdoor air is less than the enthalpy of the return air, the outdoor air may be admitted in response to a cooling demand, as will be described in detail hereinafter. If the enthalpy of the outdoor air is greater than or equal to the enthalpy of the return air, outdoor air will not be admitted.

The configuration of the damper control louvers or vanes 56 and 64, as well as positioning motor actuator 60, is exemplary. However, the present invention contemplates that the relative proportions of outdoor air and air returned from space 16 by way of opening 19 may be controlled by the positions of the sets of louvers or vanes 56 and 64, as determined by actuator or motor 60 so that all, a portion or none of the air being circulated back to space 16 may be outdoor air. A suitable pressure relief damper 73, as shown in FIG. 2, for space 72 may be provided to minimize any pressure increase in space 16 if all or a portion of the air drawn through space 55 by blower 48 for circulation to space 16 is from outdoor air. As shown in FIG. 2, a conventional air conditioning temperature sensor 80 (which may be a thermostat) is disposed in a suitable location within space 16 for sensing and controlling the temperature of the air in space 16 as determined by an adjustable setpoint of sensor 80.

Figure 3:
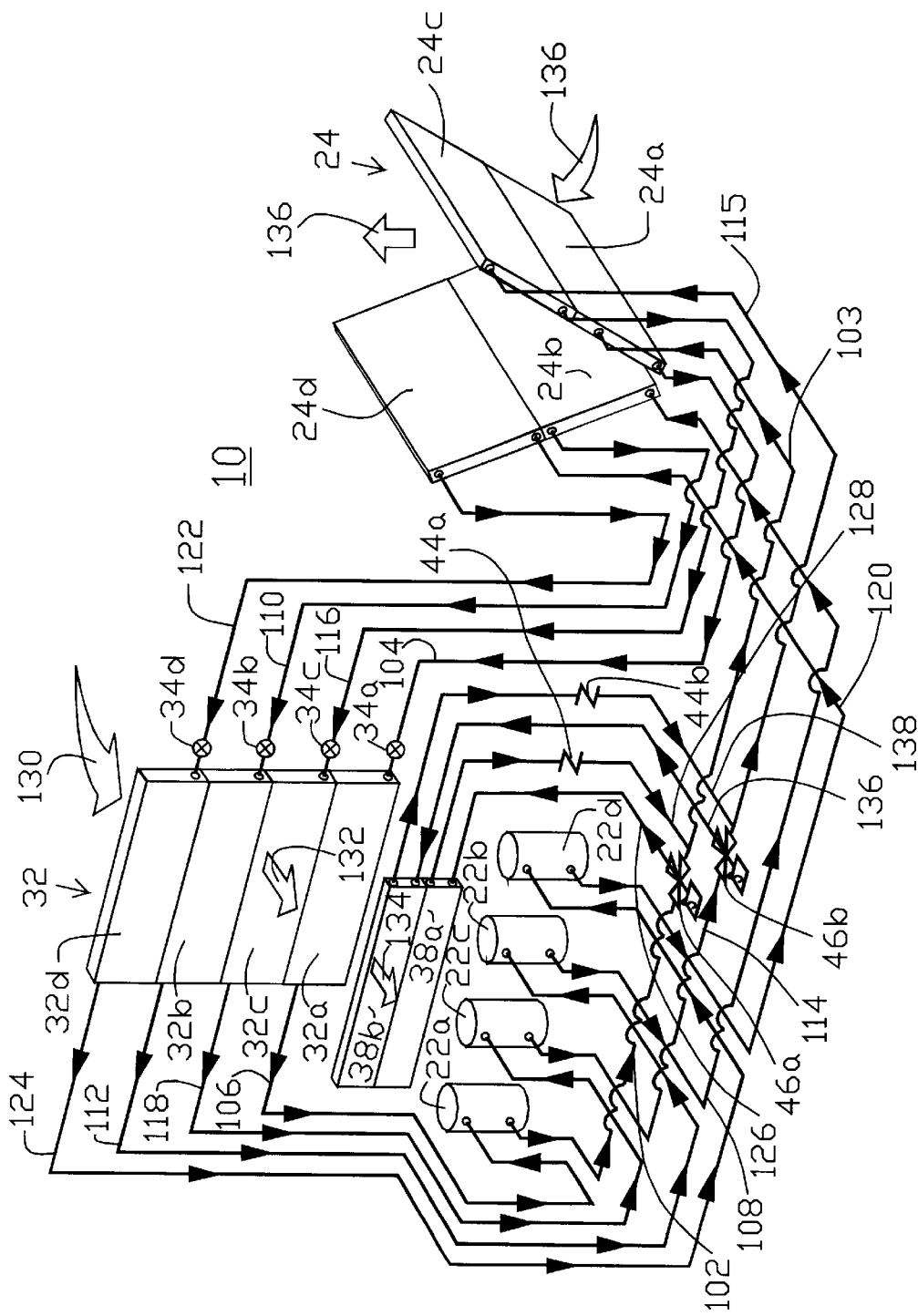
FIG. 3 is a perspective view, in somewhat schematic form, of an air conditioning system having four compressors and four discrete refrigeration circuits, in accordance with the present invention.

Referring now to FIG. 3, four discrete refrigeration circuits are depicted as part of space conditioning system 10. One skilled in the art will recognize that FIG. 3 does not show all of the components of system 10 shown in FIGS. 1 and 2 and in some cases (e.g., condenser 24) components are depicted differently from how they are depicted in FIGS. 1 and 2.

Each of the four refrigeration circuits has a compressor associated therewith. The first refrigeration circuit has a first compressor 22a, the second refrigeration circuit has a second compressor 22b, the third refrigeration circuit has a third compressor 22c and the fourth refrigeration circuit has a fourth compressor 22d. Evaporator 32 is divided into four sections 32a, 32b, 32c and 32d, each of which is associated with a corresponding one of the four refrigeration circuits. Similarly, condenser 24 is divided into four sections 24a, 24b, 24c and 24d, each of which is associated with a corresponding one of the four refrigeration circuits. Although not shown, each condenser section 24a, 24b, 24c, 24d has a fan associated therewith for moving air across the corresponding condenser section. Reheat heat exchanger 38 is divided into two sections 38a and 38b. Section 38a is part of the first refrigeration circuit and section 38b is part of the third refrigeration circuit. A first reheat valve 46a is operatively associated with the first refrigeration circuit and a second reheat valve 46b is operatively associated with the third refrigeration circuit. A first check valve 44a is operatively associated with the first refrigeration circuit and a second check valve 44b is operatively associated with the third refrigeration circuit. Expansion devices 34a, 34b, 34c and 34d are operatively associated with the first, second, third and fourth refrigeration circuits, respectively.

The first and third refrigeration circuits are operable in both a cooling mode and in a reheat mode. The second and fourth refrigeration circuits are operable only in a cooling mode. One skilled in the art will recognize that system 10 can be configured as a heat pump system by providing a reversing valve for each refrigeration circuit, whereby the flow of refrigerant therein may be reversed to operate system 10 in the heating mode. However, for simplicity purposes, only operation in a cooling mode will be described herein.

In operation, when the first refrigeration circuit is operated in the cooling mode, first compressor 22a circulates the refrigerant between condenser section 24a and evaporator section 32a. Reheat valve 46a is positioned to prevent (along with check valve 44a) refrigerant from being circulated to reheat section 38a. Specifically, hot refrigerant gas is circulated from first compressor 22a to condenser section 24a via conduits 102 and 103, wherein the refrigerant gas is substantially condensed. The condensed refrigerant then flows from condenser section 24a via a conduit 104 through expansion device 34a into evaporator section 32a. The liquid refrigerant is substantially evaporated in section 32a and is returned to first compressor 22a via a conduit 106.

When the second refrigeration circuit is operated in the cooling mode, hot refrigerant gas from second compressor 22b is conducted to condenser section 24b via a conduit 108, wherein the refrigerant is substantially condensed. The condensed refrigerant then from condenser section 24b via a conduit 110 through expansion device 34b into evaporator section 32b. The liquid refrigerant is substantially evaporated in section 32b and is returned to second compressor 22b via a conduit 112.

When the third refrigeration circuit is operated in the cooling mode, hot refrigerant gas from third compressor 22c is conducted to condenser section 24c via conduits 114 and 115, wherein the refrigerant is substantially condensed. Reheat valve 46b is positioned to prevent (along with check valve 44b) refrigerant from being circulated to reheat section 38b. The condensed refrigerant flows via a conduit 116 from condenser section 24c through expansion device 34c and into evaporator section 32c, wherein the liquid refrigerant is substantially evaporated. The refrigerant gas is returned to third compressor 22c via a conduit 118.

When the fourth refrigeration circuit is operated in the cooling mode, hot refrigerant gas from fourth compressor 22d flows via a conduit 120 to condenser section 24d, wherein the refrigerant is substantially condensed. The condensed refrigerant flows via a conduit 122 through expansion device 34d and into evaporator section 32d, wherein the liquid refrigerant is substantially evaporated. The refrigerant gas flows from section 32d back to fourth compressor 22d via a conduit 124. As will be described in detail hereinafter, one or more of the four refrigeration circuits may be operated in the cooling mode to meet the cooling demand in space 16 (FIG. 2).

To meet a dehumidification demand in space 16, one or both of the first and third refrigeration circuits are operable in the reheat mode. When the first refrigeration circuit is operated in the reheat mode, reheat valve 46a is positioned to allow hot refrigerant gas to flow from first compressor 22a to first reheat section 38a via conduit 102 and a conduit 126. The refrigerant gas circulates through reheat section 38a and may be partially condensed as it circulates therethrough. After the refrigerant circulates through reheat section 38a, it flows via a conduit 128 back through check valve 44a into conduit 102 and thereafter takes the same path as described hereinabove with respect to the cooling mode of operation of the first refrigeration circuit (i.e., to condenser section 24a and then to evaporator section 32a). Air returned from space 16, as indicated by arrow 130, is cooled as it flows through evaporator section 32a. The cooled air, represented by arrow 132, is then reheated as it passes through reheat section 38a, so that dehumidified, but not substantially cooled, air, represented by arrow 134, is supplied to space 16.

When the third refrigeration circuit is operated in the reheat mode, reheat valve 46b is positioned to allow hot refrigerant gas to flow from third compressor 22c to second reheat section 38b via conduit 114 and a conduit 136. The refrigerant gas circulates through reheat section 38b and may be partially condensed as it circulates therethrough. The refrigerant then flows via a conduit 138 back through check valve 44b into conduit 114 and thereafter takes the same path as described hereinabove with reference to the cooling mode of operation of the third refrigeration circuit (i.e., to condenser section 24c and then to evaporator section 32c). Air returned from space 16, as indicated by arrow 130, is cooled as it flows through evaporator section 32c. The cooled air, represented by arrow 132, is then reheated as it passes through reheat section 38b, so that dehumidifed, but not substantially cooled, air, represented by arrow 134, is supplied to space 16. Arrows 136 indicate the flow of air through condenser 24 by the operation of condenser fan 28 (FIG. 2). Reheat heat exchanger 38 is preferably sized with respect to evaporator 32 to provide a temperature increase such that the temperature of the air in space 16 is maintained at or near the setpoint of temperature sensor 80 (FIG. 2), thereby minimizing the sensible cooling demands of the system. Ideally, when there is a demand for dehumidification in space 16, but no demand for cooling therein, system 10 will provide dehumidified, but not cooled, air to space 16.

Figure 4:
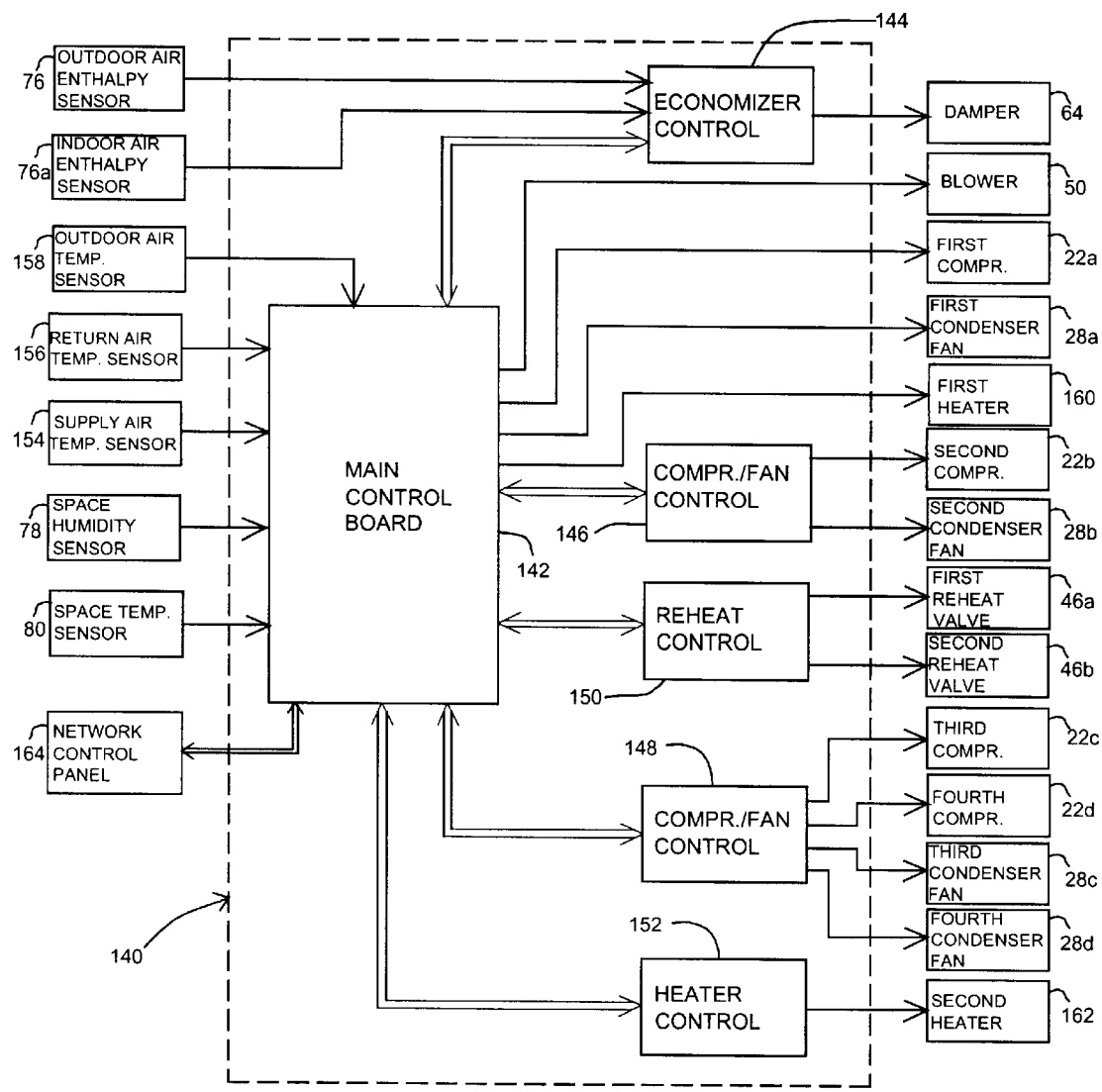
FIG. 4 is a block diagram of an electronic control system for the air conditioning system of FIG. 3, in accordance with the present invention.

Referring now to FIG. 4, control of system 10 is accomplished by means of an integrated modular control system generally referred to as numeral 140. Control system 140 includes a main control board 142, an economizer control 144, two compressor controls 146 and 148, a reheat control 150 and a heater control 152. The arrows in FIG. 4 indicate the lines of electronic communication between the various components of system 140 and the various components of system 10 being controlled by system 140. A one-way arrow indicates a one-way line of communication, while a two-way arrow indicates a two-way line of communication.

Main control board 142 receives inputs from various sensors, including space humidity sensor 78, space temperature sensor 80, a supply air temperature sensor 154, a return air temperature sensor 156 and an outdoor air temperature sensor 158. Main control board 142 communicates with economizer control 144, compressor controls 146 and 148, reheat control 150 and heater control 152 and controls blower motor 50, first compressor 22a, a first condenser fan 28a (which is operatively associated with first condenser section 24a) and a first heater 160. Economizer control 144 receives inputs from outdoor air enthalpy sensor 76 and indoor air enthalpy sensor 76a. Compressor control 146 controls second compressor 22b and a second condenser fan 28b (which is operatively associated with second condenser section 24b). Compressor control 148 controls third compressor 22c, fourth compressor 22d and third and fourth condenser fans 28c and 28c (which are operatively associated with third and fourth condenser sections 24c and 24d, respectively). Reheat control 158 controls reheat valves 46a and 46b. Heater control 152 controls a second heater 162. First and second heaters 160 and 162 may include gas heating sections (not shown) and/or electrical heating elements (not shown), which may be a part of a typical rooftop air conditioning unit, as will be appreciated by one skilled in the art. A network control panel 164 is operatively associated with main control board 142. Main control board 142 has an onboard eight bit microcontroller of the MC68HC908GP32 type, manufactured by Motorola. Further, economizer control 144, compressor controls 146, 148, reheat control 150 and heater control 152 each have an onboard microcontroller of the MC68HC705P6A type, manufactured by Motorola.

Figure 5:
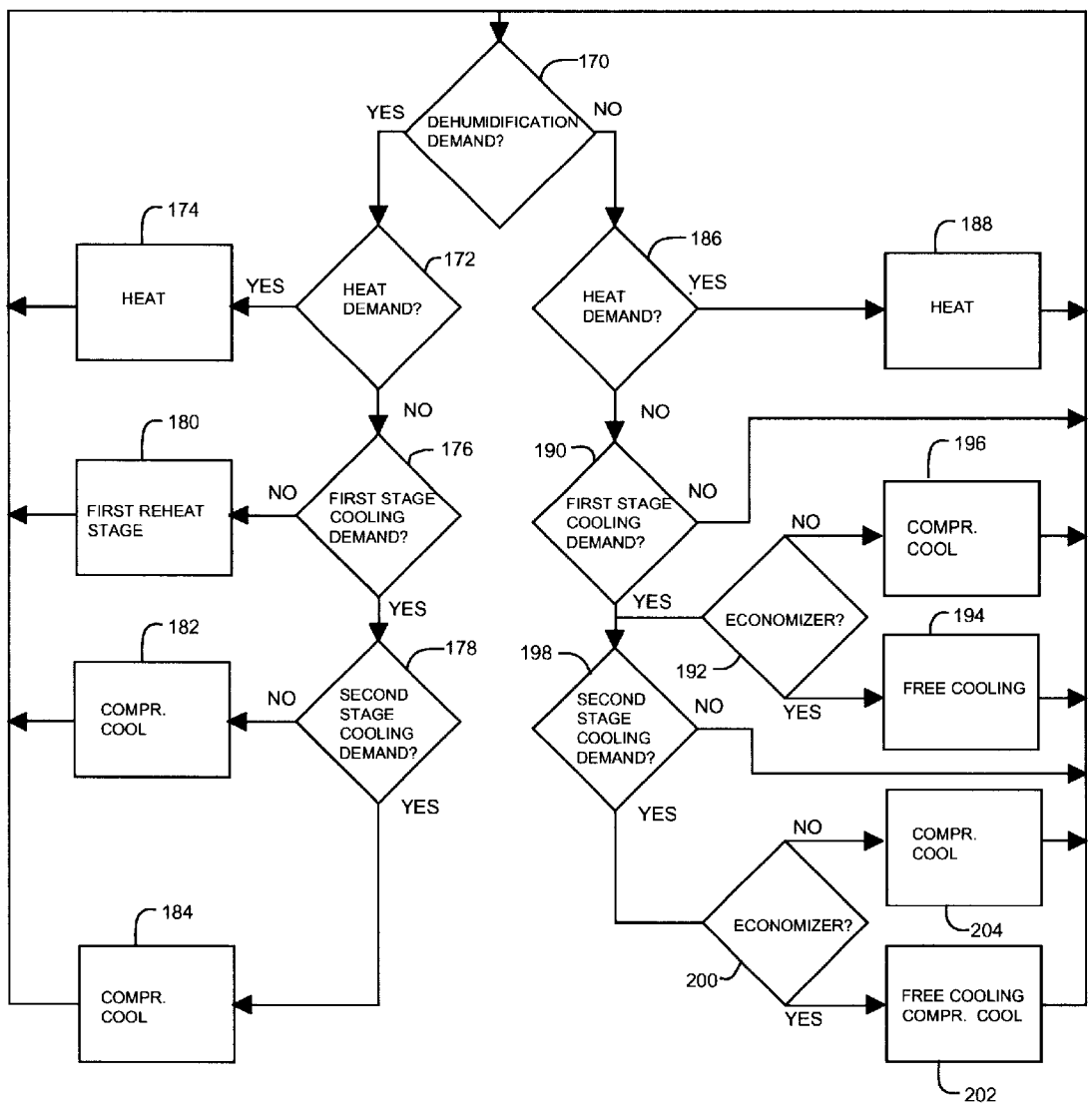
FIGS. 5–8 are flow diagrams depicting the heating, cooling and dehumidification operations of an air conditioning system having one compressor, two compressors, three compressors and four compressors, respectively, in accordance with the present invention.

Referring now to FIGS. 5–8, the control logic for a space conditioning system 10 having one, two, three and four compressors (i.e., one, two, three and four discrete refrigeration circuits) will now be described in detail. The microcontroller on main control board 142 is programmed to accomplish the control logic. Referring specifically to FIG. 5., operation of a system 10 having only one compressor and one refrigeration circuit, as shown in FIG. 1, will be now be described. Control system 140 controls the single refrigeration circuit to provide cooling and dehumidification. If there is a demand for dehumidification at decision point 170, control system 140 determines whether there is a demand for heating or cooling. Pursuant to decision point 172, if there is a demand for heating, system 10 will be operated in a heating mode (step 174) until the demand for heating has been satisfied. When there is no demand for heating, control system 140 determines whether there is a demand for cooling in space 16. The demand for cooling may be either a first stage demand or a second stage demand. If neither a first stage demand nor a second stage demand is present, (i.e., "No" at decision points 176, 178), system 10 is operated in the reheat mode (First Reheat Stage), pursuant to step 180. A first stage demand is indicated when the temperature in space 16 exceeds a first setpoint of the space temperature sensor (sensor 80 in FIG. 2). A second stage demand corresponds to a higher cooling demand than a first stage demand and occurs when the temperature in space 16 exceeds a second setpoint of the space temperature sensor, which is higher than the first setpoint. If a demand for either first stage or second stage cooling is present (i.e., "Yes" at either or both of decision points 176, 178), the refrigeration circuit is operated in the cooling mode (Compr. Cool), pursuant to either step 182 or 184, so that a cooling demand takes priority over a dehumidification demand.

If there is no dehumidification demand pursuant to decision point 170, control system 140 will determine whether there is a heating demand, pursuant to decision point 186. If a heating demand is present, system 10 will be operated in the heating mode, pursuant to step 188 until the heating demand is satisfied. When there is no demand for heating, control system 140 determines whether there is a demand for cooling in space 16. If a first stage cooling demand is present, pursuant to decision point 190, control system 140 determines whether an economizer option is available (decision point 192). In order for the economizer option to be available, system 10 must have an economizer, as described hereinabove with reference to FIG. 2, and the enthalpy of the ambient outdoor air must satisfy a predetermined condition, which typically occurs if the enthalpy of the ambient outdoor air is less than the enthalpy of the return air from space 16. If the economizer option is available, the economizer is operated to admit ambient outdoor air to system 10 (Free Cooling), pursuant to step 194. If the economizer option is not available (decision point 192), the refrigeration circuit is operated in the cooling mode (Compr. Cool), pursuant to step 196 until the demand for cooling is satisfied. If a second stage cooling demand is also present, pursuant to decision point 198 and the economizer option is available, pursuant to decision point 200, the economizer is operated to admit ambient outdoor air to system 10 and provide free cooling and the refrigeration circuit is operated in the cooling mode (Compr. Cool) to provide compressor cooling, pursuant to step 202. If the economizer option is not available, system 10 is operated in the cooling mode (Compr. Cool), pursuant to step 204. Even if an economizer option is available, ambient outdoor air will not be admitted to system 10 if there is a demand for dehumidification.

Figure 6:
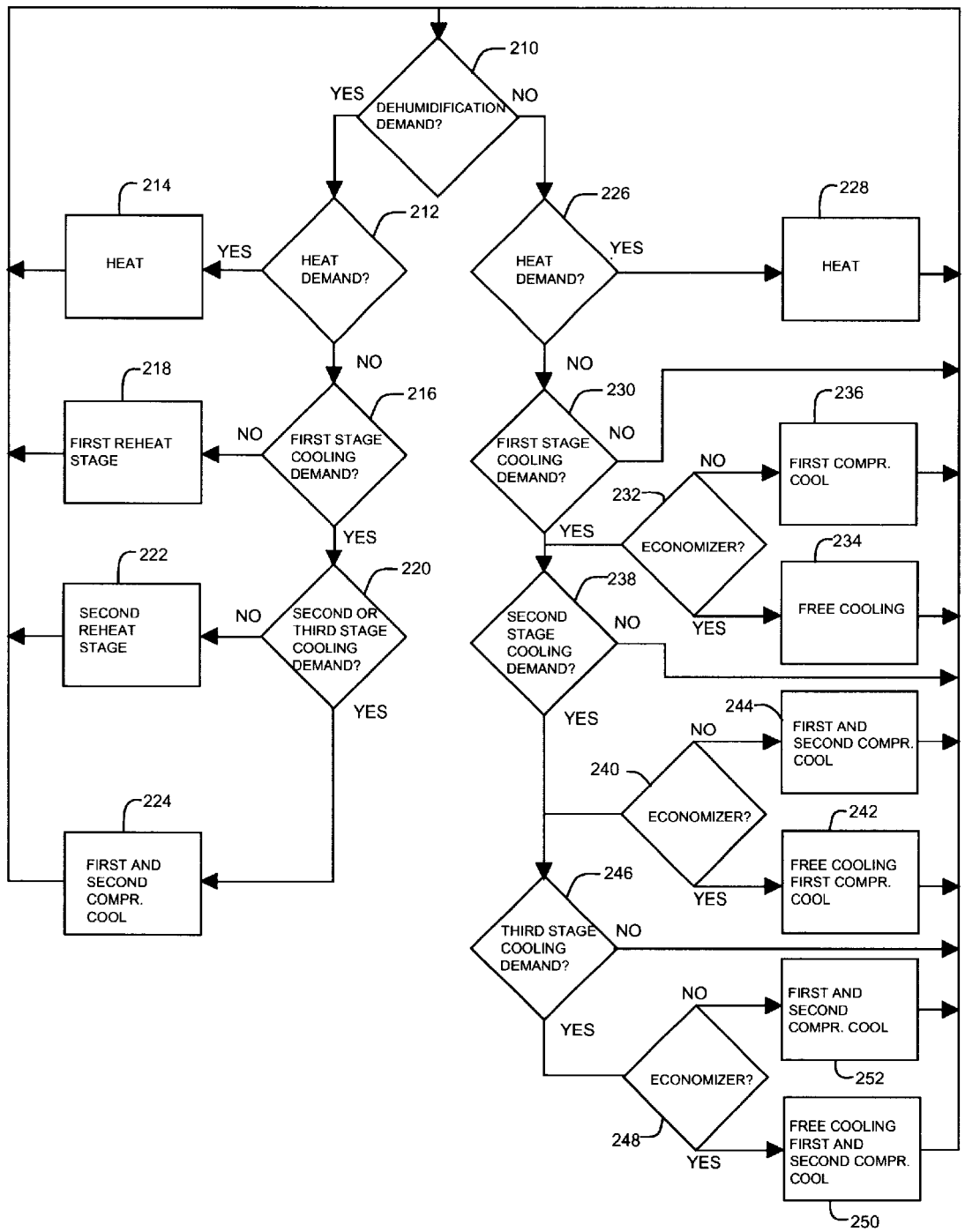

Referring now to FIG. 6, the operation of a system 10 with two refrigeration circuits is depicted. For example, the two refrigeration circuits may be the first and second refrigeration circuits shown in FIG. 3. In response to a dehumidification demand at decision point 210, control system 140 determines whether a heating demand is present (decision point 212). If so, system 10 is operated in the heating mode, pursuant to step 214, until the heating demand is satisfied. When there is no heating demand, control system 140 determines whether there is a first stage cooling demand in space 16 (decision point 216). If there is no first stage cooling demand, the first refrigeration circuit (including first compressor 22a in FIG. 3) is operated in the reheat mode (First Stage Reheat), pursuant to step 218, until the dehumidification demand is satisfied. If there is a first stage cooling demand, pursuant to decision point 216, but no second or third stage cooling demand, pursuant to decision point 220, the first refrigeration circuit is operated in the reheat mode and the second refrigeration circuit (including second compressor 22b) is operated in the cooling mode, pursuant to step 222 (Second Reheat Stage) to satisfy both the cooling demand and the dehumidification demand. If a second or third stage cooling demand is present, pursuant to decision point 220, the second or third stage cooling demand takes priority over the dehumidification demand and both the first and second refrigeration circuits will be operated in the cooling mode (First And Second Compr. Cool), pursuant to step 224. A third stage cooling demand corresponds to a higher level of cooling demand in space 16 than a second stage demand and occurs when the temperature in space 16 exceeds a third setpoint of the space temperature sensor, which is higher than the second setpoint associated with the second stage demand. In the absence of a demand for dehumidification, pursuant to decision point 210, control system 140 determines whether a heating demand is present, pursuant to decision point 226. If a heating demand is present, system 10 is operated in the heating mode, pursuant to step 228 to satisfy the heating demand. If no heating demand is present, control system 140 determines whether a first stage cooling demand is present, pursuant to decision point 230. If a first stage cooling demand is present and the economizer option is available, pursuant to decision point 232, the economizer will be operate to admit outdoor air (Free Cooling), pursuant to stop 234, to meet the first stage cooling demand. If the economizer option is not available, the first refrigeration circuit is operated in the cooling mode to satisfy the first stage cooling demand, pursuant to step 236. If a second stage cooling demand is also present, pursuant to decision point 238, control system 140 determines whether the economizer option is available, pursuant to decision point 240. If the economizer option is available (decision point 240), the economizer is operated to provide free cooling and the first refrigeration circuit is operated in the cooling mode, pursuant to step 242 (Free Cooling/First Compr. Cool), until the second stage cooling demand is satisfied. If the economizer option is not available, pursuant to decision point 240, both the first and second refrigeration circuits are operated in the cooling mode, pursuant to step 244 (First and Second Compr. Cool). If a third stage demand for cooling is present, pursuant to decision point 246, control system 140 determines whether the economizer option is available pursuant to decision point 248. If the economizer option is available, the economizer is operated to admit outdoor air (Free Cooling) and the first and second refrigeration circuits are operated in the cooling mode until the third stage cooling demand is satisfied, pursuant to step 250 (Free Cooling/First and Second Compr. Cool). If no economizer option is available, the first and second refrigeration circuits are operated in the cooling mode, pursuant to step 252 (First and Second Compr. Cool) until the third stage demand is satisfied.

Figure 7:
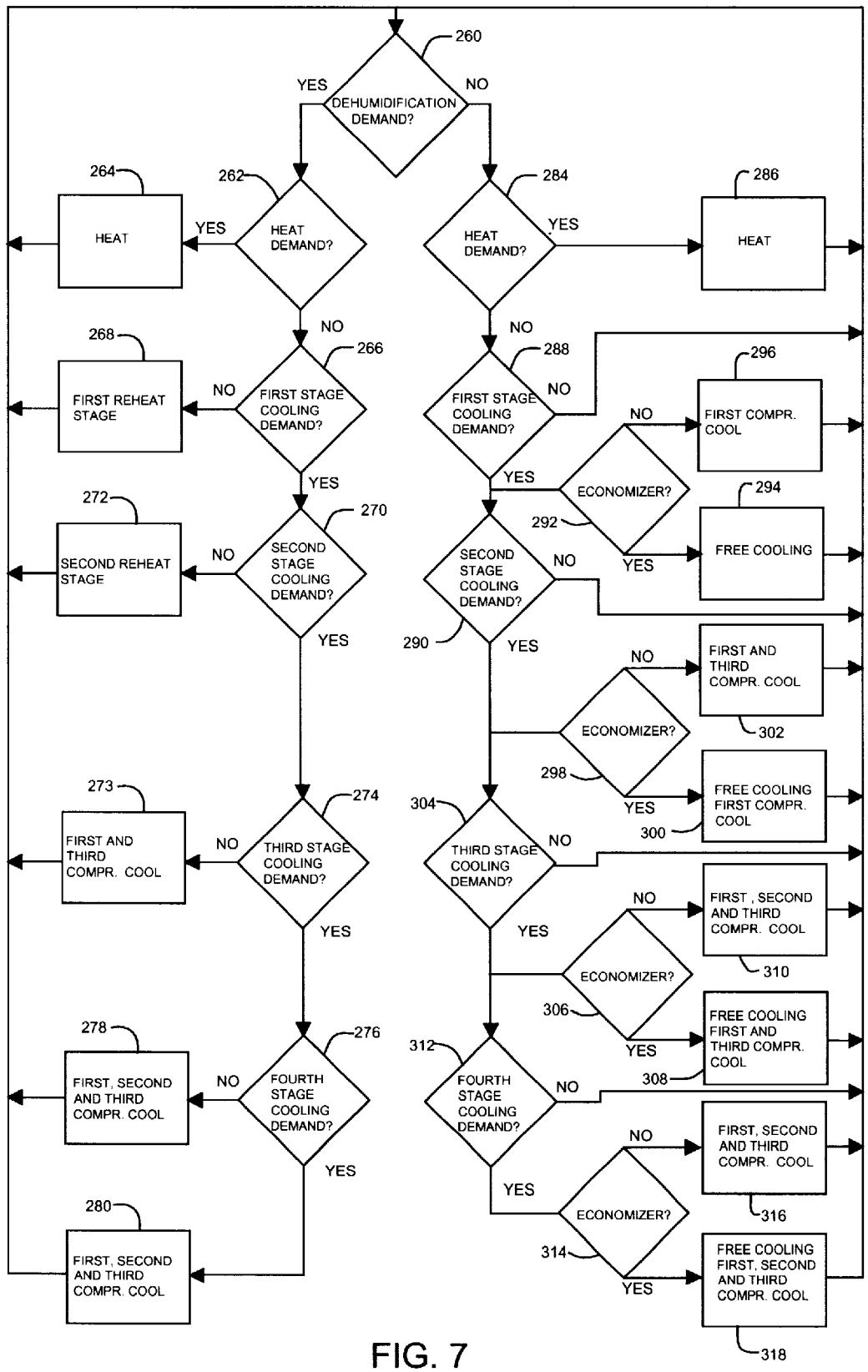

Referring now to FIG. 7, the operation of a system 10 with three refrigeration circuits (i.e., the first, second and third refrigeration circuits depicted in FIG. 3) is shown. In response to a dehumidification demand, pursuant to decision point 260, control system 140 determines whether there is a heating demand in space 16, pursuant to decision point 262. If a heating demand is present, system 10 is operated in the heating mode, pursuant to step 264, until the heating demand is satisfied. In the absence of a heating demand, control system 140 determines whether a demand for cooling is present. If there is no first stage demand for cooling (decision point 266), the first and third refrigeration circuits are operated in the reheat mode, pursuant to step 268 (First Reheat Stage), to satisfy the dehumidification demand. If there is also a first stage cooling demand, but not a second stage demand (decision point 270), the first and third refrigeration circuits are operated in the reheat mode and the second refrigeration circuit is operated in the cooling mode, pursuant to step 272 (Second Reheat Stage), to satisfy both the dehumidification demand and the cooling demand. If a second stage cooling demand is present, pursuant to decision point 270, the first and third refrigeration circuits are operated in the cooling mode (First. And Third Compr. Cool), pursuant to step 273, until the second stage demand is satisfied. A second stage demand takes priority over the dehumidification demand. If a third stage or a fourth stage (if the space temperature sensor has four setpoints) demand is present, pursuant to decision point 274 or 276, all three refrigeration circuits are operated in the cooling mode (First, Second And Third Compr. Cool), pursuant to step 278 or 280. In the event of a second, third or fourth stage cooling demand, pursuant to decision point 270, 274 or 276, the cooling demand takes precedence over the dehumidification demand, so that neither of the first and third refrigeration circuits is operated in the reheat mode until the second stage cooling demand has been satisfied.

In the absence of demand for dehumidification, control system 140 determines whether there is a demand for heating in space 16, pursuant to decision point 284. If a demand for heating is present, system 10 is operated in the heating mode, pursuant to step 286, until the heating demand is satisfied. In the absence of a heating demand, control system 140 determines whether there is a demand for first stage cooling in space 16, pursuant to decision point 288. If there is a first stage demand, but not a second stage demand, pursuant to decision point 290, control system 140 determines whether the economizer option is available, pursuant to decision point 292. If the economizer option is available, the economizer is operated to provide free cooling to space 16, pursuant to step 294. If the economizer option is not available, the first refrigeration circuit is operated in the cooling mode, pursuant to step 296 (First Compr. Cool), to satisfy the first stage cooling demand. If a second stage demand is also present, pursuant to decision point 290, control system 140 determines whether the economizer option is available, pursuant to decision point 298. If the economizer option is available, the economizer is operated to admit outdoor air (Free Cooling) to space 16 and the first refrigeration circuit is operated in the cooling mode, pursuant to step 300 (Free Cooling/First Compr. Cool). If the economizer option is not available, the first and third refrigeration circuits are operated in the cooling mode, pursuant to step 302 (First And Third Compr. Cool), to satisfy the second stage cooling demand. If a third stage cooling demand is also present, pursuant to decision point 304, control system 140 determines whether the economizer option is available, pursuant to decision point 306. If the economizer option is available, the economizer is operated to admit outdoor air (Free Cooling) to space 16 and the first and third refrigeration circuits are operated in the cooling mode, pursuant to step 308 (Free Cooling/First And Third Compr. Cool). If no economizer option is available, all three refrigeration circuits are operated in the cooling mode, pursuant to step 310 (First, Second And Third Compr. Cool). If a fourth stage cooling demand is also present, pursuant to decision point 312, control system 140 determines whether the economizer option is available, pursuant to decision point 314. If the economizer option is available, the economizer is operated to admit outdoor air (Free Cooling) to space 16 and all three refrigeration circuits are operated in the cooling mode, pursuant to step 316 (Free Cooling/First, Second And Third Compr. Cool). If no economizer option is available, all three refrigeration circuits are operated in the cooling mode, pursuant to step 318 (First, Second And Third Compr. Cool).

Figure 8:
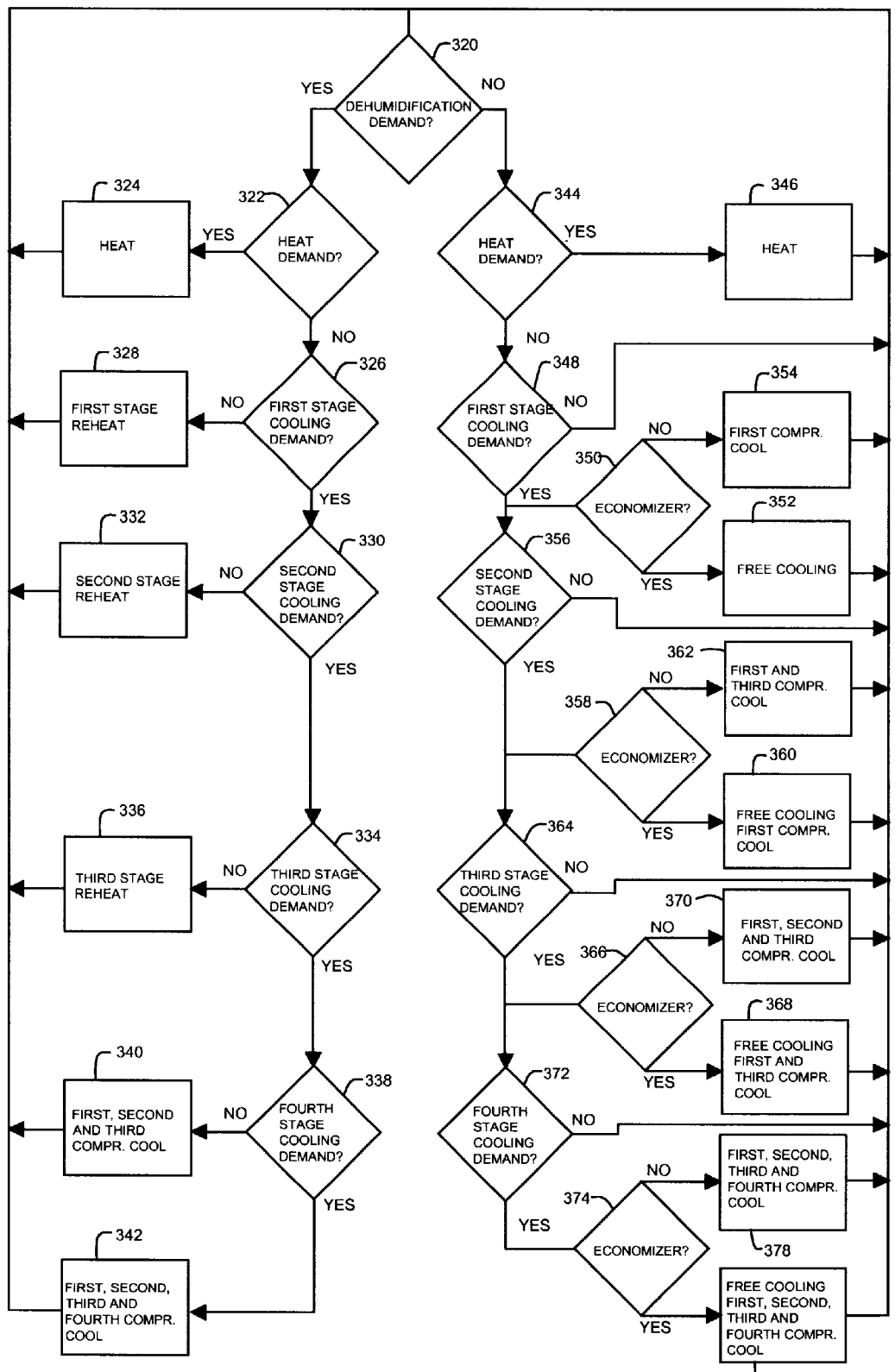

Referring to FIG. 8, a system 10 with four refrigeration circuits, as shown in FIG. 3, is depicted. In response to a dehumidification demand, pursuant to decision point 320, control system 140 determines whether a heating demand is present, pursuant to decision point 322. If a heating demand is present, system 10 is operated in the heating mode, pursuant to step 324, until the heating demand is satisfied. In the absence of a heating demand, control system 140 determines whether a first stage cooling demand is present, pursuant to decision point 326. If no cooling demand is present, the first and third refrigeration circuits are operated in the reheat mode, pursuant to step 328 (First Reheat Stage). If a first stage cooling demand is present, but a second stage demand is not present, pursuant to decision point 330, the first and third refrigeration circuits are operated in the reheat mode and the second refrigeration circuit is operated in the cooling mode, pursuant to step 332 (Second Reheat Stage). If a second stage demand for cooling is also present, but a third stage demand is not present, pursuant to decision point 334, first and third refrigeration circuits are operated in the reheat mode and the second and fourth refrigeration circuits are operated in the cooling mode, pursuant to step 336 (Third Reheat Stage). If a third stage demand is also present, but a fourth stage demand is not present, pursuant to decision point 338, the first, second and third refrigeration circuits are operated in the cooling mode, pursuant to step 340 (First, Second And Third Compr. Cool), so that the third stage cooling demand takes precedence over the dehumidification demand. If a fourth stage cooling demand is also present, all four refrigeration circuits are operated in the cooling mode, pursuant to step 342 (First, Second, Third And Fourth Compr. Cool).

In the absence of the demand for dehumidification, pursuant to decision point 320, control system 140 determines whether a heating demand is present, pursuant to decision point 344. If a heating demand is present, system 10 is operated in the heating mode, pursuant to step 346, until the heating demand is satisfied. In the absence of a heating demand, control system 140 determines whether a first stage demand for cooling is present, pursuant to decision point 348. If a first stage demand is present, control system 140 determines whether the economizer option is available, pursuant to decision point 350. If the economizer option is available, the economizer is operated to admit outdoor air (Free Cooling) to system 10, pursuant to step 352, to satisfy the first stage demand. If no economizer option is available, the first refrigeration circuit is operated in the cooling mode, pursuant to step 354 (First Compr. Cool), to satisfy the first stage cooling demand. If a second stage cooling demand is also present, pursuant to decision point 356, and the economizer option is available, pursuant to decision point 358, the economizer is operated to admit outdoor air (Free Cooling) and the first refrigeration circuit is operated in the cooling mode, pursuant to step 360 (Free Cooling/First Compr. Cool) to satisfy the second stage demand. If the economizer option is not available, the first and third refrigeration circuits are operated in the cooling mode, pursuant to step 362 (First And Third Compr. Cool). If a third stage cooling demand is also present, pursuant to decision point 364, and the economizer option is available, pursuant to decision point 366, the economizer is operated to admit outdoor air (Free Cooling) to system 10 and the first and third refrigeration circuits are operated in the cooling mode, pursuant to step 368 (Free Cooling/First And Third Compr. Cool) to satisfy the third stage cooling demand. If the economizer option is not available, the first, second and third refrigeration circuits are operated in the cooling mode, pursuant to step 370 (First, Second And Third Compr. Cool). If a fourth stage cooling demand is also present, pursuant to decision point 372, and if the economizer option is available, pursuant to decision point 374, the economizer is operated to admit outdoor air (Free Cooling) to system 10 and all four refrigeration circuits are operated in the cooling mode to satisfy the fourth stage cooling demand, pursuant to step 376 (Free Cooling/First, Second, Third And Fourth Compr. Cool). If no economizer option is available, all four refrigeration circuits are operated in the cooling mode, pursuant to step 378 (First, Second, Third And Fourth Compr. Cool).

In accordance with the present invention, a space conditioning system having multiple refrigeration circuits has the capability of simultaneously satisfying both a demand for cooling and a demand for dehumidification. In accordance with an aspect of the invention, an economizer option, even when available, is not used when there is a demand for dehumidification. In accordance with another aspect of the invention, a higher demand for cooling (e.g., a second, third or fourth stage demand, depending on how many refrigeration circuits are available) takes priority over the dehumidification demand. Operation of the refrigeration circuits is staged, depending on the level of the cooling demand and whether the cooling demand and dehumidification demand are present at the same time.

The best mode for carrying out the invention has now been described in detail. Since changes in and modifications to the above-described best mode may be made without departing from the nature, spirit or scope of the invention, the invention is not to be limited to the details set forth herein, but only by the appended claims and their equivalents.

What is claimed is:

1. A space conditioning system for conditioning air within an enclosed space, comprising:

an air mover for circulating conditioned air to the space;

plural discrete refrigeration circuits, each of which is operable in a cooling mode, wherein air circulated to the space is cooled, at least one of said refrigeration circuits being further operable in a reheat mode, wherein air circulated to the space is first cooled and-then reheated by operation of a same refrigeration circuit; and a controller for selectively controlling said system to provide the space with conditioned air, said controller being operable to cause at least one of said refrigeration circuits to operate in said cooling mode in response to a demand for cooling in the space and being further operable to cause at least one of said refrigeration circuits to operate in said reheat mode in response to a demand for dehumidification in the space.

2. The system of claim 1 wherein said controller is operable to cause at least one of said refrigeration circuits to operate in said cooling mode and at least another one of said refrigeration circuits to operate in said reheat mode in response to said demand for cooling and said demand for dehumidification both being present.

3. The system of claim 1 wherein said demand for cooling includes a first stage demand and a second stage demand, said second stage demand corresponding to a higher level of cooling demand in the space than said first stage demand, said controller being operable to prevent operation of any of said refrigeration circuits in reheat mode in response to said second stage demand, even if said demand for dehumidification is present.

4. The system of claim 3 wherein said controller is operable to cause only one of said refrigeration circuits to operate in said cooling mode in response to said first stage demand and in the absence of said second stage demand.

5. The system of claim 1 wherein said demand for cooling includes a first stage demand, a second stage demand and a third stage demand, said third stage demand corresponding to a higher level of cooling demand in the space than said second stage demand and said second stage demand corresponding to a higher level of cooling demand in the space than said first stage demand, said controller being operable to prevent operation of any of said refrigeration circuits in said reheat mode in response to said third stage demand, even if said demand for dehumidification is present.

6. The system of claim 1 further including a damper for admitting ambient outdoor air to said system for circulation to the enclosed space and an enthalpy sensor for sensing the enthalpy of the ambient outdoor air, said controller being operable to control said damper to allow the ambient outdoor air to be admitted to said system in response to said demand for cooling when the enthalpy of the ambient outdoor air satisfies a predetermined condition, said controller being further operable to control said damper to prevent the ambient outdoor air from being admitted to said system in response to said demand for dehumidification, even if said demand for cooling is present and the enthalpy of the ambient outdoor air satisfies said predetermined condition.

7. The system of claim 1 wherein each of said refrigeration circuits includes a condenser for condensing a vapor compression refrigerant, an evaporator for evaporating the refrigerant to cool the air being circulated to the space and a compressor for compressing the refrigerant and for circulating the refrigerant through said refrigeration circuit, said at least one of said refrigeration circuits operable in said reheat mode further including a reheat heat exchanger downstream of said evaporator for heating air being circulated to the space to a temperature above the temperature of air discharged from said evaporator, wherein air cooled by said evaporator is heated by said reheat heat exchanger.

8. The system of claim 1 further including a temperature sensor for sensing a temperature corresponding to temperature of air in the space and a humidity sensor for sensing a humidity corresponding to humidity of air in the space, said controller being operatively connected to said temperature sensor and said humidity sensor for selectively controlling said system to provide the space with conditioned air, said controller being operable to cause at least one of said refrigeration circuits to operate in said cooling mode in response to said temperature sensor indicating that the temperature of the air in the space is above a predetermined temperature and at least another one of said refrigeration circuits to operate in said reheat mode in response to said humidity sensor indicating that the humidity of the air in the space is above a predetermined humidity.

9. Control apparatus for a space conditioning system for conditioning air within an enclosed space, the system including an air mover for circulating conditioned air to the space and plural discrete refrigeration circuits, each of which is operable in a cooling mode, wherein air circulated to the space is cooled, at least one of said refrigeration circuits being further operable in a reheat mode, wherein air circulated to the space is first cooled and then reheated by operation of a same refrigeration circuit, said control apparatus comprising:

a controller for selectively controlling said system to provide the space with conditioned air, said controller being operable to cause at least one of said refrigeration circuits to operate in the cooling mode in response to a demand for cooling in the space and being further operable to cause at least one of said refrigeration circuits to operate in the reheat mode in response to a demand for dehumidification in the space.

10. The apparatus of claim 9 wherein said controller is operable to cause at least one of the refrigeration circuits to operate in the cooling mode and at least another one of the refrigeration circuits to operate in the reheat mode in response to said demand for cooling and said demand for dehumidification both being present.

11. The apparatus of claim 9 wherein said demand for cooling includes a first stage demand and a second stage demand, said second stage demand corresponding to a higher level of cooling demand in the space than said first stage demand, said controller being operable to prevent operation of any of the refrigeration circuits in the reheat mode in response to said second stage demand, even if said demand for dehumidification is present.

12. The apparatus of claim 11 wherein said controller is operable to cause only one of the refrigeration circuits to operate in the cooling mode in response to said first stage demand and in the absence of said second stage demand.

13. The apparatus of claim 9 wherein said demand for cooling includes a first stage demand, a second stage demand and a third stage demand, said third stage demand corresponding to a higher level of cooling demand in the space than said second stage demand and said second stage demand corresponding to a higher level of cooling demand in the space than said first stage demand, said controller being operable to prevent operation of any of said refrigeration circuits in the reheat mode in response to said third stage demand, even if said demand for dehumidification is present.

14. The apparatus of claim 9 wherein the system further includes a damper for admitting ambient outdoor air to the system for circulation to the space and an enthalpy sensor for sensing the enthalpy of the ambient outdoor air, said controller being operable to control the damper to allow the ambient outdoor air to be admitted to the system in response to said demand for cooling when the enthalpy of the ambient outdoor air satisfies a predetermined condition, said controller being further operable to prevent the ambient outdoor air from being admitted to the system in response to said demand for dehumidification, even if said demand for cooling is present and the enthalpy of the ambient outdoor air satisfies said predetermined condition.

15. The apparatus of claim 9 further including a temperature sensor for sensing a temperature corresponding to temperature of air in the space and a humidity sensor for sensing a humidity corresponding to humidity of air in the space, said controller being operatively connected to said temperature sensor and said humidity sensor for selectively controlling the system to provide the space with conditioned air, said controller being operable to cause at least one of the refrigeration circuits to operate in the cooling mode in response to said temperature sensor indicating that the temperature of the air in the space is above a predetermined temperature and at least another one of the refrigeration circuits to operate in the reheat mode in response to said humidity sensor indicating that the humidity of the air in the space is above a predetermined humidity.

16. The apparatus of claim 9 wherein said controller is operable to control the number of refrigeration circuits operated in the cooling mode and the number of refrigeration circuits operated in the reheat mode.

17. A space conditioning system for conditioning air within an enclosed space, comprising:

an air mover for circulating air to the space;

a refrigeration circuit operable in a cooling mode wherein air circulated to the space is cooled in response to a demand for cooling in the space;

a damper for admitting ambient outdoor air to said system for circulation to the space and an enthalpy sensor for sensing the enthalpy of the ambient outdoor air; and a controller for selectively controlling said system to provide the space with conditioned air, said controller being operable to control said damper to allow the ambient outdoor air to be admitted to said system in response to said demand for cooling when the enthalpy of the ambient outdoor air satisfies a predetermined condition, said controller being further operable to control said damper to prevent the ambient outdoor air from being admitted to said system in response to a demand for dehumidification in the space, even if said demand for cooling is present and the enthalpy of the ambient outdoor air satisfies said predetermined condition.

* * * * *